R. H. RYNE.

PEN AND PENCIL-CASE.

No. 6,883. Reissued Jan. 25, 1876.

WITNESSES:

Hill H. Dodge.

Dann Tuttehell.

INVENTOR:

R. H. Ryne by Dodgerson his attys.

N. PETERS, PHOTO-LITHOGRAPHER, WASHINGTON, D. C.

UNITED STATES PATENT OFFICE.

RICHARD H. RYNE, OF NEW YORK, N. Y., ASSIGNOR TO WILLIAM S. HICKS, OF SAME PLACE.

IMPROVEMENT IN PEN AND PENCIL CASES.

Specification forming part of Letters Patent No. 62,227, dated February 19, 1867; reissue No. 6,883, dated January 25, 1876; application filed December 7, 1875.

*To all whom it may concern:*

Be it known that I, RICHARD H. RYNE, of New York, in the county of New York and State of New York, have invented certain new and useful Improvements in Pen and Pencil Cases; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use the invention I will proceed to describe it.

This invention consists of a pen and pencil case constructed in a novel manner, whereby the extension-handle can be shoved in under the pen-slide and over the pencil-tube, thereby enabling the handle to be shoved in nearly the entire length of the case or body. It further consists in a novel method of connecting the rear tip to the case, whereby the difficulty and danger of injuring the rubber or other material used for the outside covering of the case is obviated, all as hereinafter more fully set forth.

Figure 1:
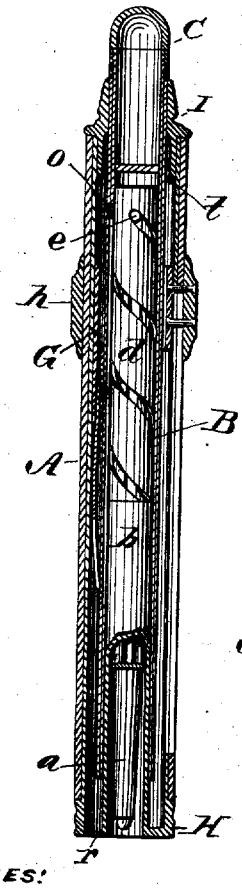
Figure 2:
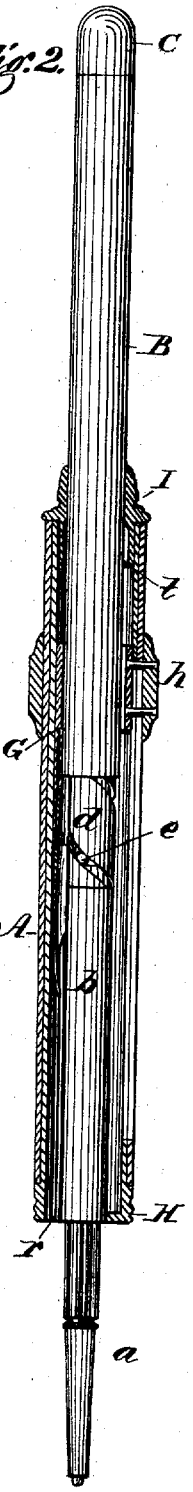
Figure 3:
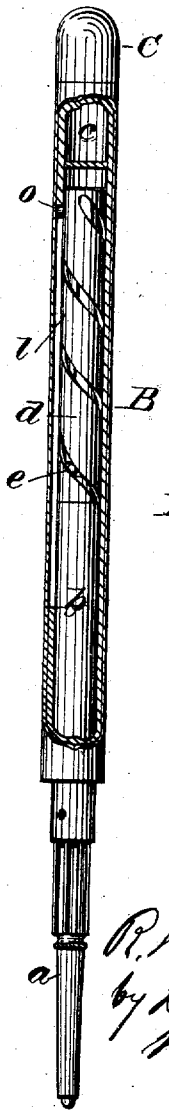
Figure 4:
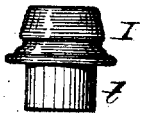

Figure 1 is a side elevation of the case, shown partly in section with the handle shoved in. Fig. 2 is a similar view with the handle extended. Fig. 3 is a side elevation of the pencil mechanism and the extension-handle, shown detached from the case or body, with the handle partly in section, to better illustrate the internal construction of the parts. Fig. 4 is a view of the rear tip shown detached, and Fig. 5 an end view of the front tip.

The object of this invention is to produce a combined pen and pencil case, having an extension-handle that can be shoved in the whole length of the case, or nearly so, and that can be put together without trouble or danger of injuring the covering of the case in securing or fastening the parts together.

Attempts have heretofore been made to construct pen and pencil cases with an extension-handle; but, as constructed, the extension part could only be shoved in a short distance, simply to the pen-slide and no farther, and, consequently, could not be made sufficiently short and compact for pocket use.

This difficulty is remedied in the present invention in the following manner: The pencil-tube is made of two parts, *b* and *d*, as represented in Figs. 1, 2, and 3, the upper portion of the part *b* being reduced in diameter, so as to permit the part *d* to fit over it and come flush with the exterior surface of the part *b*, the whole thus forming a pencil-tube and screw of uniform diameter externally its whole length. The pencil-point *a* is connected to a smaller tube placed within the tube *b*, and at its upper end carries a pin, *e*, which projects through a straight slot in the upper or reduced portion of the tube *b*, and also through a spiral slot in the part *d*, whereby the point is shoved out and in by turning the part *d*, which works loosely on the reduced portion of *b*.

The manner of operating the pencil is the same as usual; but it will be seen that by this construction of the parts *b* and *d* they form a pencil-tube and screw the external diameter of which is uniform throughout its entire length, whereas, as heretofore constructed in this class of cases, the part *b* was of full size its whole length, and the part *d* of larger size put over it.

The handle B is composed of an inner metallic tube, which has a longitudinal slot, *l*, as shown in Fig. 3, extending nearly its whole length, and in which a pin, O, protruding from the side of the part *d* at its upper end, operates, thus permitting the handle to slide back and forth over the pencil-tube and screw, and also causes the part *d* to revolve with the handle B when the latter is turned.

An outer tube or covering of rubber or metal is placed over the inner tube of the handle in order to give a proper finish. In the upper end of the handle is made a chamber, *c*, for the leads, which is closed by a screw-cap, C, as shown in Fig. 3.

The case or body A consists of an inner metallic tube, with an outer covering of hard rubber or other suitable material. Inside of this case A is fitted a pen holder or slide, G, connected, by pins, to a ring, *h*, outside of the case, by which the pen is shoved in or out, the case A having a longitudinal slot for the pins to work through, in the usual manner.

As shown in Figs. 1 and 2, the case A and the pen-holder G are of such a size as to permit the extension-handle B to slide within the latter, and between it and the pencil-tube and screw, thus permitting the handle to be shoved down within the case its whole length, thus rendering the case very short and compact when closed, and of good length when the handle is drawn out; and this, it will be seen, is accomplished without making the case A of an enlarged diameter, as it would have to be if the part *d* of the pencil-tube were made large enough to fit over the part *b*, as has heretofore been done.

Figure 5:
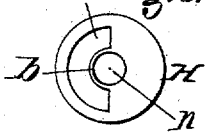

The pencil-tube is connected to the lower end of the case A by a metallic tip, H, as shown in Figs. 1 and 2, an end view of the same being shown in Fig. 5. This tip H is soldered to the metallic portion of the case A, and also to the end of the pencil-tube *b*, the pencil sliding through the central opening *n*, and the pen through the curved slot or opening *r*, (shown in Fig. 5,) the upper end of the pencil-tube being held in position, centrally in the case, by the handle B, as shown in Figs. 1 and 2.

A metallic tip, I, serves to hold the handle B centrally within the upper end of the case A, and also to hold the outer covering of the case A in place, as shown in Figs. 1 and 2. Heretofore it has been customary to first solder this tip I to the inner tube of the case A, then slip on the rubber covering, and afterward secure the lower tip H in place by soldering it to the inner metallic tube of case A, and to the lower end of the pencil-tube.

As the heat necessary for this operation is apt to injure the rubber or other similar covering of the case, it has been necessary to wrap the same with a wet piece of paper, or similar material, to keep it cool while soldering, thereby rendering the operation both difficult and tedious. To obviate this difficulty, the tip I, as shown in Fig. 4, is constructed with a tubular neck, *t*, of the proper size to permit it to be crowded into the end of the case A, as represented in Figs. 1 and 2, with sufficient force to be held by friction alone, the exterior of the neck *t* being preferably made slightly rough, to give it a better hold and prevent it from working loose. In this case the tip H is first soldered fast, the rubber cover then slipped on, after which the tip I is forced to its seat, which completes the operation. By this means the danger of injuring the case, as above mentioned, is obviated.

Another advantage of this plan is, that whenever it becomes necessary to put on a new rubber covering, or to repair any of the other parts, the case can be taken apart and put together again very quickly and without injury. The pencil-tube and screw made on this plan is equally applicable to cases which have a pencil only, and by its use the case can be made of less diameter than those formerly used.

Having thus described the invention, what is claimed as new is—

1. A combined pen and pencil case, having pen and pencil both located at one end, with an extension-handle, constructed and arranged to slide between the pen-slide and pencil-tube, substantially as and for the purpose set forth.

2. In combination with a pencil-tube and screw of uniform diameter, an extension-handle arranged to slide within the case and over said pencil-tube its entire length, or nearly so, substantially as shown and described.

3. The tip I, constructed and secured to the case A, substantially as described, whereby the necessity of soldering the same is avoided, as and for the purpose set forth.

WILLIAM S. HICKS.

Witnesses:

WILLIAM H. SEMBLER,
EDWARD D. HICKS.